United States Patent
Petersson et al.

(10) Patent No.: US 11,139,864 B2
(45) Date of Patent: Oct. 5, 2021

(54) TRANSMISSION OF REFERENCE SIGNALS FROM A TERMINAL DEVICE

(71) Applicant: Telefonaktiebolaget LM Ericsson (publ), Stockholm (SE)

(72) Inventors: Sven Petersson, Sävedalen (SE); Fredrik Athley, Kullavik (SE); Andreas Nilsson, Gothenburg (SE); Roy Timo, Järfälla (SE); Xinlin Zhang, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 162 days.

(21) Appl. No.: 16/343,175

(22) PCT Filed: Feb. 19, 2019

(86) PCT No.: PCT/EP2019/054061
§ 371 (c)(1),
(2) Date: Apr. 18, 2019

(87) PCT Pub. No.: WO2020/169181
PCT Pub. Date: Aug. 27, 2020

(65) Prior Publication Data
US 2020/0395981 A1    Dec. 17, 2020

(51) Int. Cl.
*H04W 4/00* (2018.01)
*H04B 7/0404* (2017.01)
(Continued)

(52) U.S. Cl.
CPC ......... *H04B 7/0404* (2013.01); *H04B 7/0469* (2013.01); *H04B 7/0608* (2013.01);
(Continued)

(58) Field of Classification Search
CPC .. H04B 7/0404; H04B 7/0469; H04B 7/0608; H04B 7/0617; H04B 7/0697; H04L 5/005; H04L 25/0226
See application file for complete search history.

(56) References Cited

U.S. PATENT DOCUMENTS

2013/0155891 A1* 6/2013 Dinan ................. H04L 5/0053
370/252
2017/0041113 A1* 2/2017 Park ..................... H04B 7/063
(Continued)

FOREIGN PATENT DOCUMENTS

| WO | 2017039510 A1 | 3/2017 |
| WO | 2018127781 A1 | 7/2018 |
| WO | 2018228478 A1 | 12/2018 |

OTHER PUBLICATIONS

International Search Report issued in corresponding International Application No. PCT/EP2019/054061, dated Oct. 4, 2019, 5 pages.
(Continued)

*Primary Examiner* — Minh Trang T Nguyen
(74) *Attorney, Agent, or Firm* — Rothwell, Figg, Ernst & Manbeck, P.C.

(57) ABSTRACT

There is provided mechanisms for transmission of reference signals. A method is performed by a terminal device. The terminal device comprises at least two physical antenna ports. The method comprises creating a virtual antenna port for, and applied over, at least two of the physical antenna ports. The method comprises transmitting, in the virtual antenna port, as many uplink reference signals as there are physical antenna ports.

20 Claims, 6 Drawing Sheets

(51) Int. Cl.
| | |
|---|---|
| *H04B 7/0456* | (2017.01) |
| *H04B 7/06* | (2006.01) |
| *H04L 5/00* | (2006.01) |
| *H04L 25/02* | (2006.01) |

(52) U.S. Cl.
CPC ......... *H04B 7/0617* (2013.01); *H04B 7/0697* (2013.01); *H04L 5/005* (2013.01); *H04L 25/0226* (2013.01)

(56) References Cited

U.S. PATENT DOCUMENTS

2018/0182503 A1\* 6/2018 Mashio .............. G05B 23/0235
2019/0140729 A1\* 5/2019 Zhang .................. H04B 7/0669
2020/0343947 A1\* 10/2020 Petersson ............ H04B 7/0478

OTHER PUBLICATIONS

Ericsson "On full power UL transmission" 3GPP TSG RAN WG1 Meeting #96, Athens, Greece, Feb. 25-Mar. 1, 2019, R1-1902826, 18 pages.

Qualcomm Incorporated "Full Tx power for UL transmissions" 3GPP TSG RAN WG1 Meeting #96, Athens, Greece, Feb. 25-Mar. 1, 2019, R1-1903011, 14 pages.

\* cited by examiner

Fig. 1

TRANSMISSION OF REFERENCE SIGNALS FROM A TERMINAL DEVICE

CROSS REFERENCE TO RELATED APPLICATION(S)

This application is a 35 U.S.C. § 371 National Phase Entry Application from PCT/EP2019/054061, filed Feb. 19, 2019, designating the United States, the disclosure of which is incorporated herein in its entirety by reference.

TECHNICAL FIELD

Embodiments presented herein relate to a method, a terminal device, a computer program, and a computer program product for transmission of reference signals.

BACKGROUND

In communication systems, there may be a challenge to obtain good performance and capacity for a given communications protocol, its parameters and the physical environment in which the communication system is deployed.

For example, multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly simply referred to as MIMO.

In the fifth generation (5G) New radio (NR) air interface, support is provided in the uplink (i.e., from served terminal device to serving radio access network node) for MIMO with up to 4 layer spatial multiplexing using at least 4 physical antenna ports with channel dependent precoding. The spatial multiplexing mode is aimed for high data rates in favorable channel conditions.

In more detail, the information carrying symbol vector s is multiplied by an $N_T$-by-r precoder matrix W, which serves to distribute the transmit energy in a subspace of the $N_T$ (corresponding to the $N_T$ physical antenna ports) dimensional vector space. The precoder matrix is typically selected from a codebook of possible precoder matrices, and is typically indicated by means of a transmit precoder matrix indicator (TPMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

In codebook based precoding for the uplink of 5G NR air interface, the radio access network node starts with configuring the terminal device to transmit uplink reference signals according to the number of antenna ports it would like the terminal device to use for uplink transmission to enable channel measurements. The radio access network node transmits, based on the channel measurements of the received uplink reference signals, the TPMI to the terminal device that the terminal device should use on the antenna ports. A single precoder that is supposed to cover a large bandwidth (wideband precoding) may be signaled.

Other information than TPMI is generally used by the radio access network node to determine the uplink MIMO transmission state, such as uplink reference signal resource indicators (SRIs) as well as transmission rank indicator (TRIs). These parameters, as well as the modulation and coding state (MCS), and the uplink resources where the uplink data is to be transmitted, are also determined by channel measurements derived from transmission of uplink reference signals from the terminal device. The transmission rank, and thus the number of spatially multiplexed layers, is reflected in the number of columns of the precoder W. For efficient performance, it is important that a transmission rank that matches the channel properties is selected.

Depending on terminal device implementation, it may be possible to maintain the relative phase of the transmit chains of an antenna array (assuming for example one radio chain per antenna element). In this case, the terminal device is enabled to transmit the same modulation symbol over multiple transmit chains with individual gain and/or phase per transmit chain and in this way forming a beam over the corresponding antenna array. This transmission of a common modulation symbol or signal on multiple antenna elements with controlled phase is referred to as coherent transmission. The support for coherent uplink MIMO transmission in Release 10 of the Long Term Evolution (LTE) suite of telecommunication standards is indicated via a feature group indication for relative transmit phase continuity for uplink spatial multiplexing, wherein a terminal device indicates if it can adequately maintain the relative phase of transmit chains over time in order to support coherent transmission.

In other terminal device implementations, the relative phase of the transmit chains may not be well controlled, and coherent transmission may not be used. In such implementations, it may still be possible for the terminal device to transmit on one of the transmit chains at a time, or to transmit different modulation symbols on the transmit chains. In the latter case, the modulation symbols on each transmit chain may form a spatially multiplexed, or MIMO, layer. This class of transmission is referred to as non-coherent transmission.

In still other terminal device implementations, the relative phase of a subset of the transmit chains is well controlled, but not over all transmit chains. One possible example is described above with respect to multi-panel operation, where phase is well controlled among transmit chains within a panel, but phase between panels is not well controlled. This class of transmission is referred to as partially-coherent.

All three of these variants of relative phase control have been agreed to be supported for transmission over the 5G NR air interface, and so terminal device capabilities have been defined for full coherence, partial coherence, and non-coherent transmission. Depending on coherence capability of the terminal device, it is possible to configure the terminal device with three different combinations of codebook subsets. FIG. 1 illustrates three different codebook subsets 10, 20, 30 for rank 1 precoders. Codebook subset 10 is referred to as non-coherent and only consists of antenna selection precoders. Codebook subset 20 is referred to as partial-coherent and only consists of antenna pair selection precoders. Codebook subset 30 is referred to as fully-coherent and only consists of full linear combining precoders. Depending on the terminal device coherence capability, the radio access network node can configure the terminal device with three different combinations of the codebook subsets. For non-coherent terminal devices, the radio access network node is expected to configure the terminal device with only the non-coherent codebook subset 10. For partially-coherent terminal devices, the radio access network node is expected to configure the terminal device with both the non-coherent and the partial-coherent codebook subsets 10, 20, and for fully-coherent terminal devices, the radio access network node is expected to configure the terminal device with all three codebook subsets 10, 20, 30.

At lower frequencies (such as below 6 GHz) it is expected that the terminal device has a pure digital antenna implementation, with one baseband port, or physical antenna port, per physical antenna (compared to mmWave frequencies where the terminal devices are expected to (at least initially) have antenna panel implementations with analog beamforming within each antenna panel). As an illustrative example, assume a terminal device equipped with four physical antenna ports and four physical antennas with antenna elements pointing in different directions. Depending on the carrier frequencies the antenna element patterns are expected to be more or less directional. For lower frequencies the antenna patterns are typically fairly omni-directional, but when the carrier frequency increases the antenna element pattern typically becomes more and more directional.

It is expected that the maximum allowed output power radiated from the terminal device for transmission at below 6 GHz will be 23 dBm. For cost and energy efficiency reasons it is preferred to in the terminal device have power amplifiers (PAs) with as low maximum output power as possible. One reason for this is that the energy efficiency of the PA is reduced the larger the difference is between the applied output power and the maximum supported output power of the PA, which will drain the battery of the terminal device.

As an example, for a terminal device equipped with four physical antennas, each fed by its own PA, it is enough that each PA can transmit with a maximal output power of 17 dBm for the terminal device to reach the maximum output power of 23 dBm. However, this requires that the terminal device transmits on all four physical antennas, which in some cases is not optimal, for example if one physical antenna is blocked or pointing in the wrong direction. Also for non-coherent terminal devices, the terminal device can only use antenna selection precoders 10, which means that if the terminal device transmits single layer transmission, only one physical antenna can be used and hence the maximum possible output power will be 17 dBm. One way to mitigate this is to use one PA with 23 dB maximum output power and having the remaining three PAs with 17 dBm output power. In this way it is still possible to transmit single layer transmission on one physical antenna and reach the maximum allowed output power of 23 dBm, whilst still keeping the cost and energy efficiency of the PA architecture as high as possible.

Consider as an example a non-coherent terminal device, where none of the PAs, or only one of the PAs, at the terminal device are supporting the maximum allowed output power of 23 dBm, and the remaining PAs support substantially less output power (for example 17 dBm per PA for a terminal device with four physical antenna ports). Assume further that the terminal device experiences coverage problems and would therefore benefit from transmitting single layer transmission with full output power. In many cases this will not be possible for the terminal device with normal operation, since the non-coherent codebook 10 only has port selection precoders. Further, even if the terminal device has one 23 dB PA there is a risk that the physical antenna connected to this PA is blocked or is pointing in the wrong direction.

Hence, there is still a need for mechanisms that could improve the coverage and user throughput for terminal devices in the uplink.

SUMMARY

An object of embodiments herein is to provide an efficient mechanism that improves the coverage and user throughput for terminal devices in the uplink, not suffering from the above noted issues, or at least where the above issues are mitigated or reduced.

According to a first aspect there is presented a method for transmission of reference signals. The method is performed by a terminal device. The terminal device comprises at least two physical antenna ports. The method comprises creating a virtual antenna port for, and applied over, at least two of the physical antenna ports. The method comprises transmitting, in the virtual antenna port, as many uplink reference signals as there are physical antenna ports.

According to a second aspect there is presented a terminal device for transmission of reference signals. The terminal device comprises at least two physical antenna ports. The terminal device further comprises processing circuitry. The processing circuitry is configured to cause the terminal device to create a virtual antenna port for, and applied over, at least two of the physical antenna ports. The processing circuitry is configured to cause the terminal device transmit, in the virtual antenna port, as many uplink reference signals as there are physical antenna ports.

According to a third aspect there is presented a terminal device for transmission of reference signals. The terminal device comprises at least two physical antenna ports. The terminal device further comprises a create module configured to create a virtual antenna port for, and applied over, at least two of the physical antenna ports. The terminal device further comprises a transmit module configured to transmit, in the virtual antenna port, as many uplink reference signals as there are physical antenna ports.

According to a fourth aspect there is presented a computer program for transmission of reference signals, the computer program comprising computer program code which, when run on a terminal device, causes the terminal device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously the disclosed transmission of reference signals enables improvements of the coverage and user throughput for the terminal device in the uplink.

Advantageously this enables non-coherent terminal devices, as well as partially coherent terminal devices, with PAs each supporting less than the maximum allowed output power to still transmit single layer transmission with full output power. Advantageously, in turn this will improve the coverage and user throughput for the terminal device in the uplink.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

Figure 1:
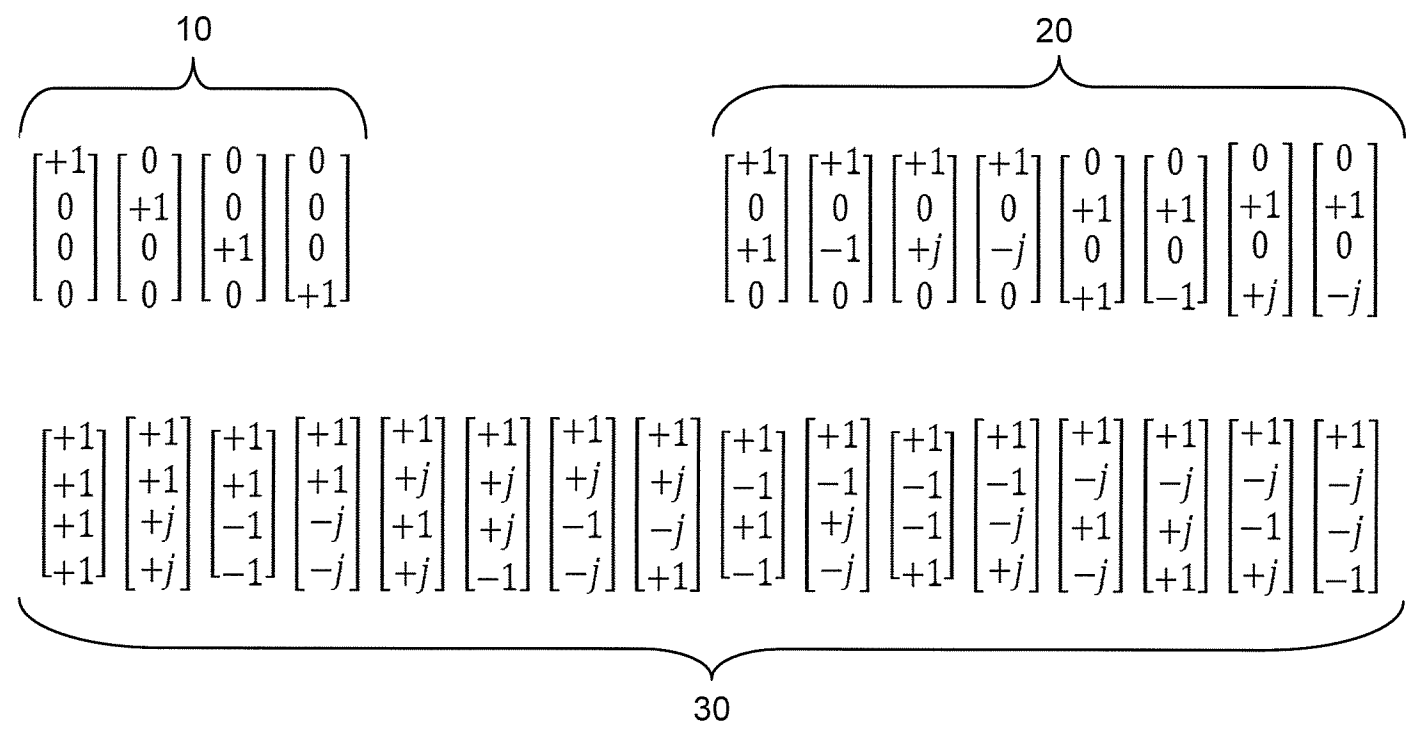

FIG. 1 schematically illustrates precoders;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
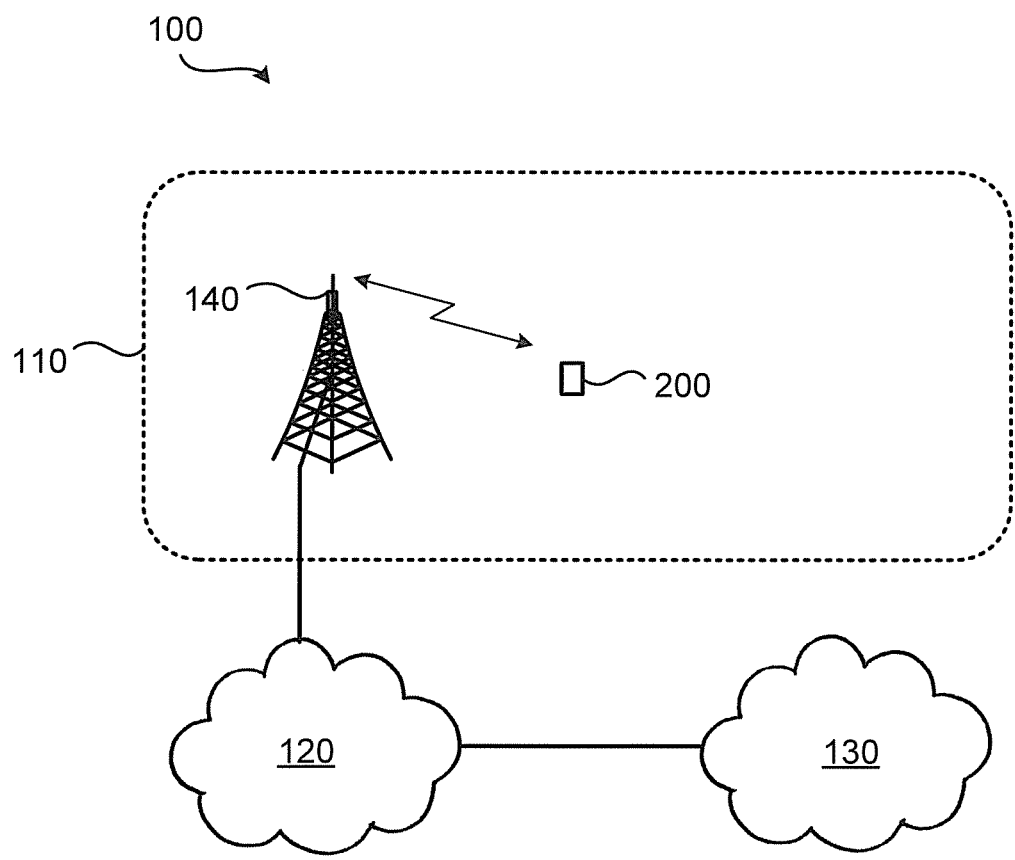
FIG. 2 is a schematic diagram illustrating a communication system according to embodiments.

FIG. 2 is a schematic diagram illustrating a communication system 100 where embodiments presented herein can be applied. The communications system 100 comprises a radio access network node 140 configured to provide network access over one or more radio propagation channels to a terminal device 200 in a radio access network no. Non-limited examples of terminal devices 200 are portable wireless devices, mobile stations, mobile phones, handsets, wireless local loop phones, user equipment (UE), smartphones, laptop computers, tablet computers, network equipped sensors, network equipped vehicles, and Internet of Things (IoT) devices. In some embodiments the radio access network node 140 is part of, integrated with, or collocated with a radio base station, base transceiver station, node B, evolved node B, gNB, access point, or the like. The radio access network no is operatively connected to a core network 120. The core network 120 is in turn operatively connected to a packet data network 130, such as the Internet. The terminal device 200 is thereby, via the radio access network node 140, enabled to access services of, and exchange data with, the service network 130.

As noted above, there is a need for mechanisms that could improve the coverage and user throughput for terminal devices in the uplink (i.e. from terminal device 200 towards radio access network node 140).

In more detail, regulatory requirements on emissions for terminal devices 200 at comparatively high frequencies state a limit on field strength per unit area. Hence, it could be beneficial to spread the output power over the antenna aperture as much as possible to maximize the allowed output power. Also, too high power transmitted from a single antenna (or panel) might cause local overheating at the terminal device 200.

Further, in the 3GPP specifications for NR, the output power for PUSCH (denoted $P_{PUSCH}$) is not only based on the output power (denoted P) defined from the power control loop of the terminal device 200, but it is also scaled with the ratio between the number of antenna ports with a non-zero PUSCH transmission and the number of configured antenna ports.

The definition of "antenna port" is different for codebook based and non-codebook based UL transmission. For codebook based UL transmission the "antenna port" can more or less be seen as a physical antenna port for sub 6 GHz (as long as no sub-arrays are used). This means, for example, that if a terminal device 200 is configured with four physical antenna ports and it uses a precoder for PUSCH that only utilizes one out of the four physical antenna ports, then the PUSCH output power should be: $P_{PUSCH}=P\cdot 1/4=P/4$. This means, for example, that if P is equal to $P_{max}$ (i.e. 23 dBm), only a quarter of the maximal output power (i.e. 17 dBm) can actually be used for the PUSCH transmission for this precoder. This leads to inefficient output power usage for codebook base uplink transmission, when applying antenna selection or antenna pair selection precoders.

Figure 3:
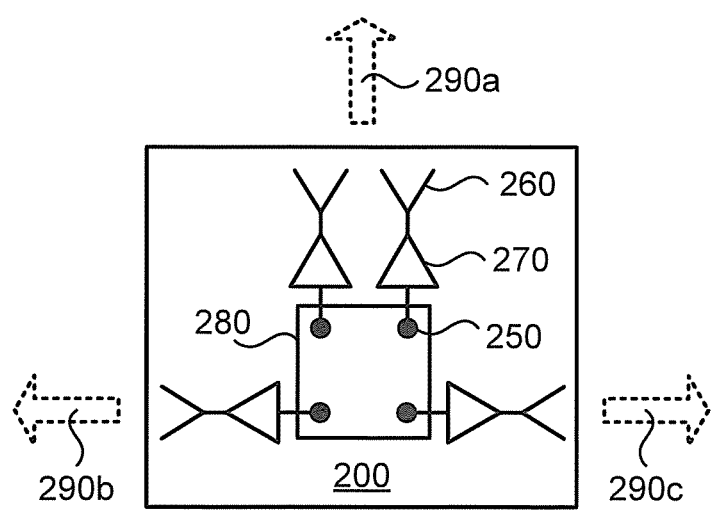
FIG. 3 schematically illustrates a terminal device according to an embodiment.

FIG. 3 schematically illustrates a terminal device 200 equipped with four physical antennas 260. As the skilled person understands, these are just examples and the terminal device 200 might be equipped with more physical antennas 260. Each physical antenna 260 has its own power amplifier (PA) 270. That is, each physical antenna port 250 is fed by its own PA 270. Each physical antenna 260 is connected to baseband circuitry 280 via its own physical antenna port 250. Thereby, when the terminal device 200 transmits reference signals, each of the reference signals comes from a respective one of the physical antenna ports 250. In some aspects the terminal device 200 has four or eight physical antenna ports 250 in total (depending on the number of physical antennas 260). Although each physical antenna 260 in FIG. 3 is illustrated as comprising only one single antenna element, as the skilled person understands, each physical antenna 260 might be implemented as an array of antenna elements. That is, each physical antenna port 250 could be operatively connected to only a single antenna element or an array of at least two antenna elements. In the illustrative example of FIG. 3, the antenna element or array of at least two antenna elements of at least two of the physical antenna ports 250 are arranged at the terminal device 200 to point in at least two mutually different pointing directions 290a, 290b, 290c. Two of the physical antennas 260 point in direction 290a, and a respective one of the physical antennas 260 points in directions 290b and 290c.

For illustrative purposes, assume that three of the physical antennas 260 have a PA 270 with a maximum output power of 17 dBm, and one of the PAS 270 has a maximum output power of 23 dBm. It is thereby possible for the terminal device 200 to transmit with full output power also for a single antenna, whilst still keeping the cost low and the energy efficiency high with a couple of low power PAs. However, since the antennas might become blocked and/or be pointing in the wrong direction (such as away from the serving radio access network node 140) it is possible that the physical antenna fed by the 23 dBm PA is more or less useless even though it can transmit at 6 dB higher output power than the other physical antennas. In accordance with the herein disclosed embodiments it is possible for the terminal device 200 to create a virtual antenna port that is distributed over two or more, or even all, physical antenna ports. For example, if the physical antenna fed by the 23 dBm PA is totally blocked, the virtualized antenna port might only be distributed over the three physical antenna ports of the remaining physical antennas to save energy.

The embodiments disclosed herein relate to mechanisms for transmission of reference signals. In order to obtain such mechanisms there is provided a terminal device 200, a method performed by the terminal device 200, a computer program product comprising code, for example in the form of a computer program, that when run on a terminal device 200, causes the terminal device 200 to perform the method.

Figure 4:
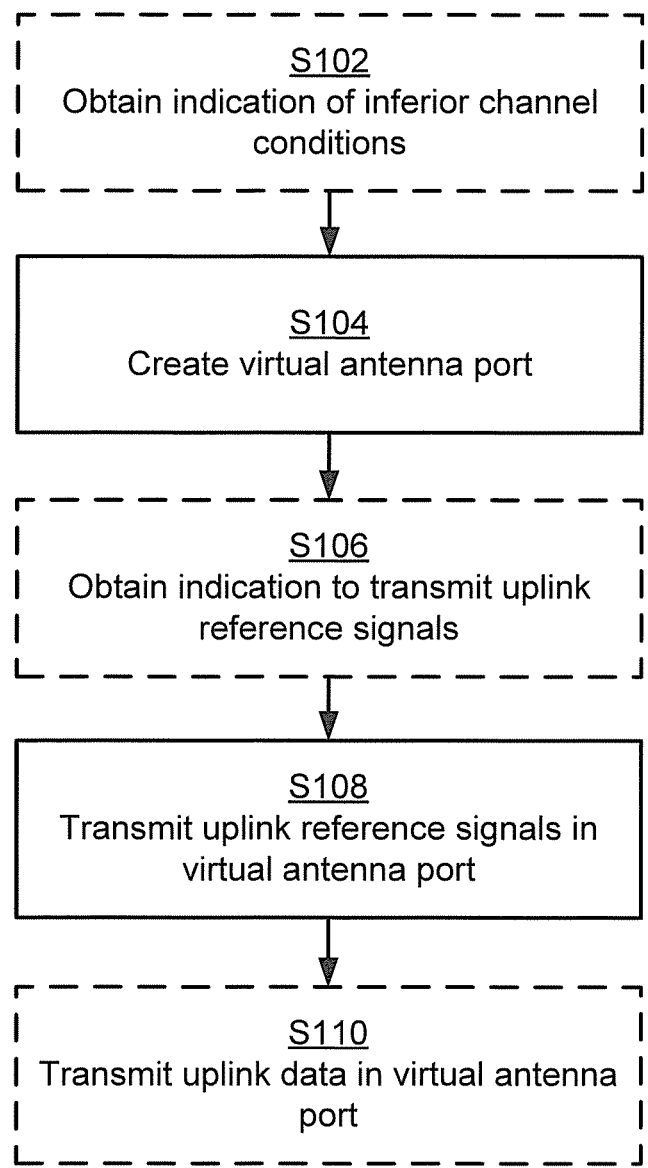
FIG. 4 is a flowchart of methods according to embodiments.

FIG. 4 is a flowchart illustrating embodiments of methods for transmission of reference signals. The methods are performed by the terminal device 200. The terminal device comprises at least two physical antenna ports 250. The methods are advantageously provided as computer programs 920.

The method is based on combining at least two physical antenna ports 250 to one virtual antenna port 520 and transmitting, using the virtual antenna port 520, as many reference signals as there are physical antenna ports 250. Hence, the terminal device 200 is configured to perform steps S104 and S108:

S104: The terminal device 200 creates a virtual antenna port 520 for, and applied over, at least two of the physical antenna ports 250.

S108: The terminal device 200 transmits, in the virtual antenna port 520, as many uplink reference signals as there are physical antenna ports 250.

Thereby, when a non-coherent terminal device 200 detects that it has problem with coverage and would benefit from using single layer transmission with full output power, instead of transmitting one reference signal per physical antenna port 250, the terminal device 200 creates a new virtualized antenna port 520 applied over at least two physical antenna ports 250, and then transmit all reference signals over the virtualized antenna port 520. The radio access network node 140 would then select the same, or less, rank transmission as the number of virtual antenna ports 520 that were created (since all uplink reference signals transmitted on the same virtual antenna port are fully correlated). That is, of one single new virtualized antenna port 520 is applied over all the physical antenna ports 250, then the radio access network node 140 would select rank 1 transmission.

In some aspects the terminal device 200 is a non-coherent terminal device and hence only has access to non-coherent precoders 10 for uplink transmission. In other aspects the terminal device 200 is a partially-coherent terminal device and hence only has access to non-coherent precoders 10 and partial-coherent precoders 20 for uplink transmission.

Embodiments relating to further details of transmission of reference signals as performed by the terminal device 200 will now be disclosed.

In some aspects the terminal device 200 measures signals received from the radio access network node 140 on all physical antenna ports 250 in order to investigate if one, or multiple physical antennas 260 at the terminal device 200 is/are blocked or perhaps pointing in the wrong direction. Particularly, according to an embodiment, the terminal device 200 is configured to perform (optional) step S102:

S102: The terminal device 200 obtains an indication of inferior physical radio propagation channel conditions. The virtual antenna port 520 is then created in response thereto (i.e., in response to having obtained the indication in step S102). That is, in some examples the virtual antenna port 520 is created, as in step S104, when blocking, etc. is detected.

There could be different types of inferior physical radio propagation channel conditions, such as low throughput, low signal to noise ratio (SNR), low signal to interference plus noise ratio (SINR), etc. as caused by blocking, poor link budget, high path loss, etc.

According to an embodiment, the indication of inferior physical radio propagation channel conditions is given per physical antenna port 250. For which at least two physical antenna ports 250 the virtual antenna port 520 is created and applied over is then based on the indication per physical antenna port 250. In this way the terminal device 200 will not transmit unnecessary output power on a physical antenna 260 that anyway does not improve the link budget.

In some aspects the terminal device 200 is triggered by the radio access network node 140 to transmit the uplink reference signals. Particularly, according to an embodiment, the terminal device 200 is configured to perform (optional) step S106:

S106: The terminal device 200 obtains an indication from a network node 140 for the terminal device 200 to transmit the uplink reference signals. The uplink reference signals are then transmitted in response thereto. That is, the uplink reference signals are transmitted in step S108 in response to the terminal device 200 having obtained the indication in step S106.

There could be different examples of uplink reference signals. According to an example, the uplink reference signals are sounding reference signals (SRS). In some aspects the uplink reference signals are transmitted over the 5G NR air interface.

Figure 5:
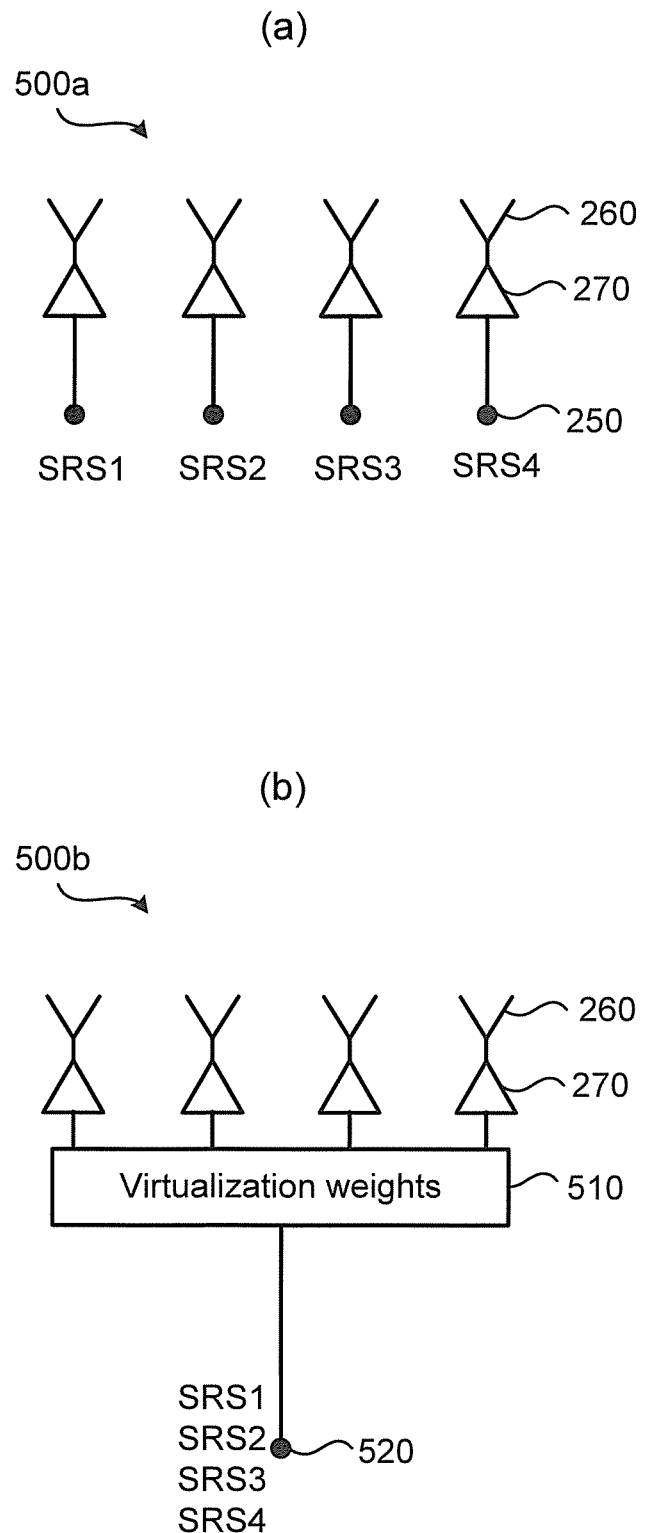
FIG. 5 schematically illustrates transmission of reference signals in antenna ports.

Parallel reference is now made to FIG. 5. FIG. 5 illustrates at (a) transmission of uplink reference signals SRS1, SRS2, SRS3, SRS4 according to prior art and at (b) transmission of the same uplink reference signals according to an embodiment as herein disclosed. At 500a is illustrated an antenna arrangement where each physical antenna is fed with its own signal. Hence, each physical antenna transmits its own reference signal. At 500b is illustrated an antenna arrangement where one virtual antenna port 520 has been created such that all physical antennas are fed with the same signal. The virtualization is performed in the baseband circuitry 280 (not shown in FIG. 5). That is, in some aspects one single virtual antenna port 520 is created. The virtual antenna port 520 might be created for all physical antenna ports 250 of the terminal device 200. Thereby, the transmission of all reference signals is distributed over all the physical antennas.

Assume that the terminal device 200 only has access to non-coherent precoders (i.e. antenna selection precoders) in a non-coherent codebook. Assume further that the terminal device 200 has 17 dB output power per PA 270, and that the maximum allowed output power for the terminal device 200 is 23 dBm. Assume further that the terminal device 200 is coverage limited, and that the power control loop indicates to the terminal device 200 to use the maximum allowed output power of 23 dBm.

Then, in the example of FIG. 5(a) the only way for the terminal device 200 to transmit with 23 dBm output power is for the terminal device 200 to transmit with rank 4 if assumed that the terminal device 200 transmits one SRS per physical antenna port. However, rank 4 transmission in coverage limited scenarios does typically neither maximize coverage nor user throughput. In this scenario it would be better to apply single layer transmission (i.e. rank 1) whilst still utilizing all available output power. This is achieved by creating a virtual antenna port 520, as in step S104, that distributes the available power over all four physical antennas 250 in accordance with virtualization weights 510 as in FIG. 5(b). The terminal device 200 then transmits all four SRS ports (i.e., all the uplink reference signals) on this virtual antenna port 520 as in step S108.

One example of virtualization weights 510 is a vector w=[1 1 1 1]/2, which thus would distribute the power equally over all four physical antenna ports. All four SRS ports are then transmitted using the same virtual antenna port 250. This means that the radio access network node 140 will receive four fully correlated uplink reference signals from the terminal device 200 and hence select rank 1 transmission.

In some aspects, in case the physical radio propagation channel is not very frequency selective, it is possible to introduce artificial frequency selectivity by delay diversity by having virtualization weights 510 that are different in different subbands. That is, according to an embodiment, the reference signals are transmitted over a frequency interval, the virtual antenna port 520 is created by applying virtualization weights 510 to the physical antenna ports 250, and the virtualization weights 510 are different for different frequency subbands within the frequency interval. For example, a linear phase progression that increases with frequency could be applied over the signals transmitted on the physical antennas. By carefully selecting the frequency dependence of this phase progression variations of the antenna radiation pattern over the scheduled bandwidth can be attained without reducing the coherence bandwidth that could reduce the processing gain in the uplink reference signal based channel estimation.

In some aspects, uplink data transmission from the terminal device 200 will utilize the same virtual antenna port 520 as was used for transmission of the uplink reference signals. Particularly, according to an embodiment, the terminal device 200 is configured to perform (optional) step S110:

S110: The terminal device 200 transmits, in the virtual antenna port 520, uplink data.

There could be different examples of uplink. In some examples the uplink data is transmitted on a physical uplink shared channel (PUSCH). A non-coherent terminal device 200 might thus transmit PUSCH on all its physical antennas and therefore attaining the full output power of 23 dBm. That is, all PAs can be used for the rank 1 PUSCH transmission, which means that single layer transmission with full output power can be achieved.

It might be so that the phase of the radio chains in the terminal device 200 changes between the uplink transmission of reference signals and the uplink transmission of data, for example if the phase of the PAs changes with output power and the output power is different for the uplink transmission of reference signals and the uplink transmission of data. However, this issue could be handled by the outer loop link adaptation.

The combining of the single layer from the four physical antenna ports 250 might be random in situations of lack of phase control of the different radio chains in the terminal device 200. This means that the beamforming gain might be reduced in the direction of the serving radio access network node 140. However, since there typically is a rich scattering environment around the terminal device 200 (especially for a coverage limited terminal device 200 located in a non line of sight direction (NLOS) with regards to the radio access network node 140), and the antenna radiation patterns typically are pointing in random directions with random phase and polarization, the beamforming gain is expected to average out over the transmitted frequency band.

Figure 6:
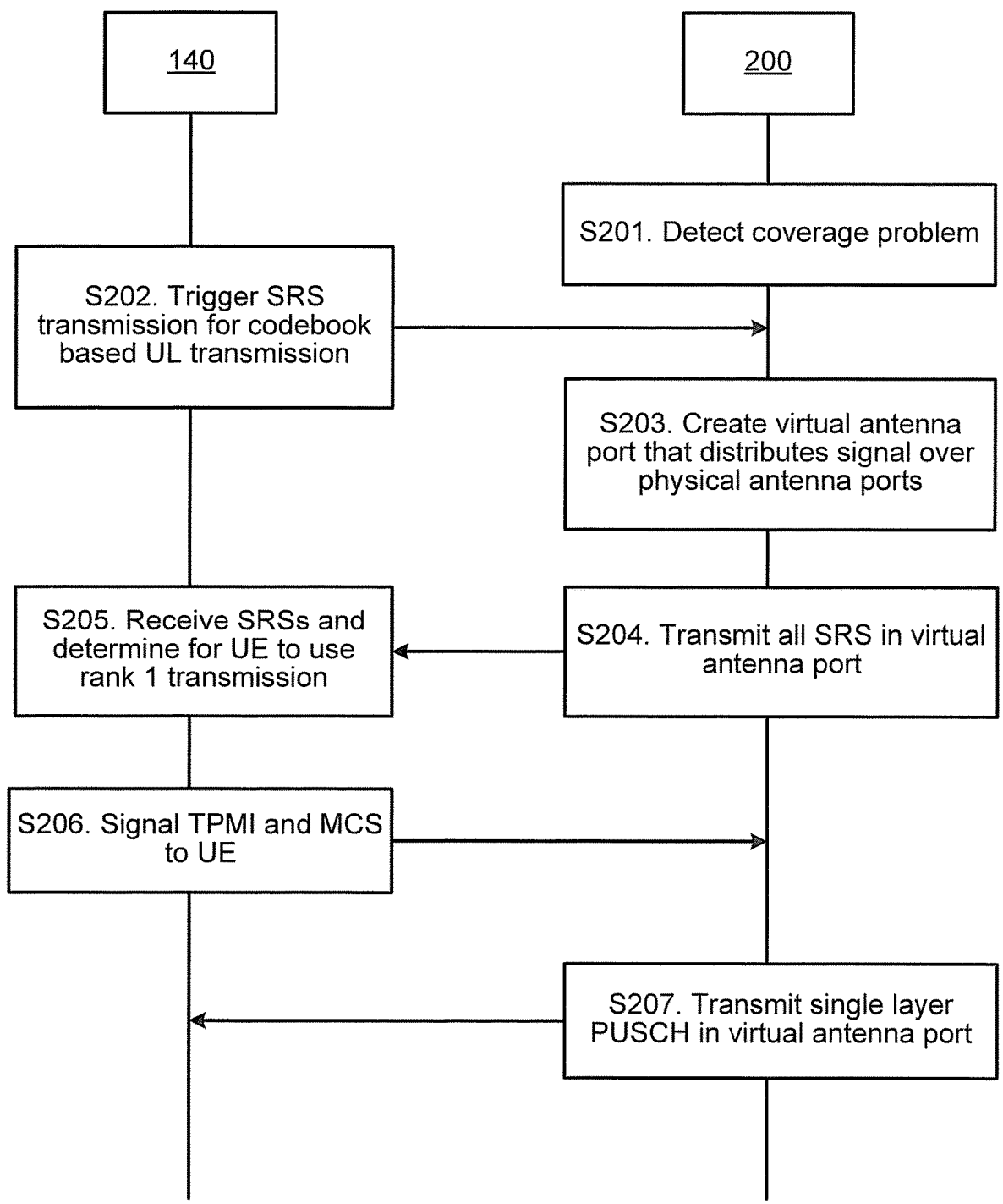
FIG. 6 is a signalling diagram of a method according to an embodiment.

FIG. 6 is a signalling diagram of a method according to at least some of the herein disclosed embodiments for a four port non-coherent terminal device 200 with 17 dBm output power per PA.

S201: The terminal device 200 detects that it is experiencing coverage problems. The terminal device 200 would thus benefit from maximizing the output power whilst applying single layer transmission. One way to detect this is for the terminal device 200 to monitor the uplink power control loop and/or the MCS and rank used for previous transmissions.

S202: The radio access network node 140 triggers SRS transmission for the terminal device 200 for future codebook based uplink transmission from the terminal device 200.

S203: The terminal device 200 creates a virtual antenna port 520 that distributes all the uplink reference signals (i.e., SRS1, SRS2, SRS3, and SRS4) over the physical antenna ports 250. The virtual antenna port 520 is thus distributed over all four physical antenna ports 250.

S204: The terminal device 200 transmits all the uplink reference signals in the created virtual antenna port 520. The terminal device 200 thus transmits all four SRS ports in the virtual antenna port 520.

S205: The radio access network node 140 receives the uplink reference signals from the terminal device 200. Because all the uplink reference signals were transmitted in the virtual antenna port 520 that distributed all the uplink reference signals over the physical antenna ports 250, the radio access network node 140 will determine the terminal device 200 to use rank 1 for the future codebook based uplink transmission. That is, since the SRSs are transmitted on the same virtual antenna port 520, the radio access network node 140 will believe that all four physical antenna ports 250 at the terminal device 200 are fully correlated and hence propose single layer transmission for coming PUSCH transmission.

S206: The radio access network node 140 signals a TPMI and MCS corresponding to rank 1 to the terminal device 200. The TPMI selected by the radio access network node 140 might be more or less random since all PMIs will be equally good and therefore it does not matter which TPMI is selected.

S207: The terminal device 200 transmits the uplink data in the created virtual antenna port 520 and thereby transmits a single layer PUSCH. The terminal device 200 can hence utilize all its available output power.

Figure 7:
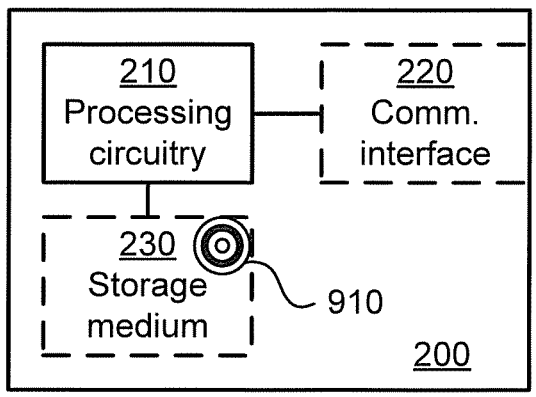
FIG. 7 is a schematic diagram showing functional units of a terminal device according to an embodiment.

FIG. 7 schematically illustrates, in terms of a number of functional units, the components of a terminal device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200 to perform a set of operations, or steps, as disclosed above. For example, the storage medium 230 may store the set of operations, and the processing circuitry 210 may be configured to retrieve the set of operations from the storage medium 230 to cause the terminal device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The terminal device 200 may further comprise a communications interface 220 at least configured for communications with other entities, nodes, functions, and devices of the communication system 100. As such the communications interface 220 may comprise one or more transmitters and receivers, comprising analogue and digital components. The processing circuitry 210 controls the general operation of the terminal device 200 e.g. by sending data and control signals to the communications interface 220 and the storage medium 230, by receiving data and reports from the communications interface 220, and by retrieving data and instructions from the storage medium 230. Other components, as well as the related functionality, of the terminal device 200 are omitted in order not to obscure the concepts presented herein.

Figure 8:
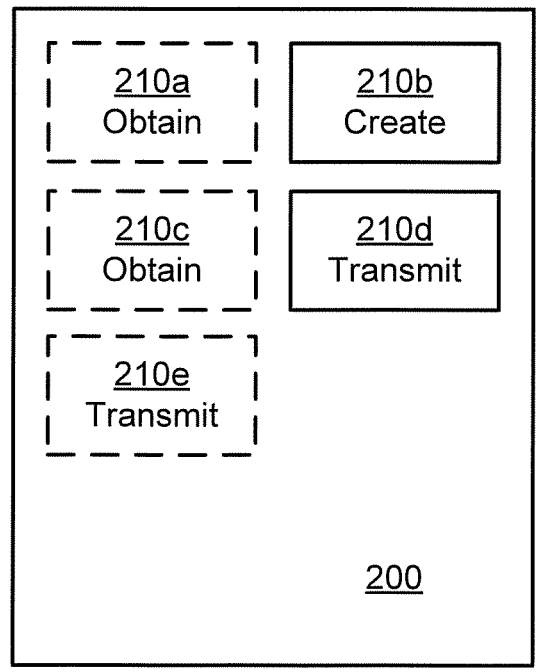
FIG. 8 is a schematic diagram showing functional modules of a terminal device according to an embodiment.

FIG. 8 schematically illustrates, in terms of a number of functional modules, the components of a terminal device 200 according to an embodiment. The terminal device 200 of FIG. 8 comprises a number of functional modules; a create module 210b configured to perform step S104, and a transmit module 210d configured to perform step S108. The terminal device 200 of FIG. 8 may further comprise a number of optional functional modules, such as any of an obtain module 210a configured to perform step S102, and obtain module 210c configured to perform step S106, and a transmit module 210e configured to perform step S110. In general terms, each functional module 210a-210e may in one embodiment be implemented only in hardware and in another embodiment with the help of software, i.e., the latter embodiment having computer program instructions stored on the storage medium 230 which when run on the processing circuitry makes the terminal device 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 10a-210e may be implemented by the processing circuitry 210, possibly in cooperation with the communications interface 220 and/or the storage medium 230. The processing circuitry 210 may thus be configured to from the storage medium 230 fetch instructions as provided by a functional module 10a-210e and to execute these instructions, thereby performing any steps as disclosed herein.

Examples of terminal devices 200 have been given above.

Figure 9:
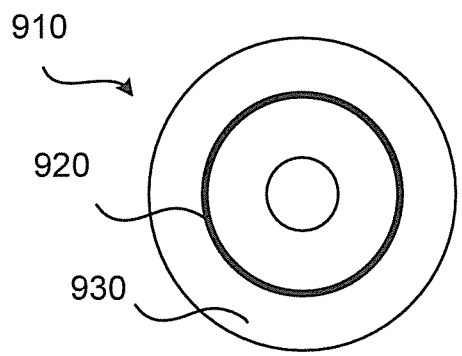
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transmission of reference signals, the method being performed by a terminal device, the terminal device comprising at least two physical antenna ports, the method comprising:
   obtaining an indication of inferior physical radio propagation channel conditions;
   based at least on obtaining the indication of inferior physical radio propagation channel conditions, creating a virtual antenna port for, and applied over, at least two of the physical antenna ports; and
   transmitting, in the virtual antenna port, as many uplink reference signals as there are physical antenna ports.

2. The method according to claim 1, wherein the terminal device only has access to non-coherent precoders for uplink transmission.

3. The method according to claim 1, wherein the terminal device only has access to non-coherent precoders and partial-coherent precoders for uplink transmission.

4. The method according to claim 1, wherein the reference signals are transmitted over a frequency interval, wherein the virtual antenna port is created by applying virtualization weights to the physical antenna ports, and wherein the virtualization weights are different for different frequency subbands within the frequency interval.

5. The method according to claim 1, wherein one single virtual antenna port is created.

6. The method according to claim 1, wherein the virtual antenna port is created for all physical antenna ports of the terminal device.

7. The method according to claim 1, wherein the terminal device has four or eight physical antenna ports in total.

8. The method according to claim 1, wherein each physical antenna port is fed by its own power amplifier.

9. The method according to claim 1, wherein each physical antenna port is operatively connected to only a single antenna element or an array of at least two antenna elements.

10. The method according to claim 9, wherein the antenna element or array of at least two antenna elements of at least two of the physical antenna ports are arranged at the terminal device to point in at least two mutually different pointing directions.

11. The method according to claim 1, wherein the uplink reference signals are sounding reference signals, SRS.

12. The method according to claim 1, further comprising: obtaining an indication from a radio access network node for the terminal device to transmit the uplink reference signals, and wherein the reference signals are transmitted in response thereto.

13. The method according to claim 1, further comprising: transmitting, in the virtual antenna port, uplink data.

14. The method according to claim 13, wherein the uplink data is transmitted on a physical uplink shared channel, PUSCH.

15. The method according to claim 14, wherein the uplink reference signals are transmitted over the 5G New Radio, NR, air interface.

16. The method according to claim 1, wherein the inferior physical radio propagation channel conditions are any one or a combination of throughput condition, signal to noise ratio condition, and low signal to interference plus noise ratio condition.

17. The method according to claim 1, wherein
said at least two physical antenna ports comprise a first physical antenna port and a second physical antenna port, and
the indication of the inferior physical radio propagation channel conditions is only for the first physical antenna port.

18. A terminal device for transmission of reference signals, the terminal device comprising at least two physical antenna ports, the terminal device further comprising processing circuitry, the processing circuitry being configured to cause the terminal device to:
obtain an indication of inferior physical radio propagation channel conditions;
based at least on obtaining the indication of inferior physical radio propagation channel conditions, create a virtual antenna port for, and applied over, at least two of the physical antenna ports; and
transmit, in the virtual antenna port, as many uplink reference signals as there are physical antenna ports.

19. A terminal device for transmission of reference signals, the terminal device comprising at least two physical antenna ports, the terminal device further comprising:
an obtaining module configured to obtain an indication of inferior physical radio propagation channel conditions;
a create module configured to, based at least on obtaining the indication of inferior physical radio propagation channel conditions, create a virtual antenna port for, and applied over, at least two of the physical antenna ports; and
a transmit module configured to transmit, in the virtual antenna port, as many uplink reference signals as there are physical antenna ports.

20. A computer program product comprising a computer program for transmission of reference signals and a non-transitory computer readable storage medium on which the computer program is stored the computer program comprising:
computer code which, when run on processing circuitry of a terminal device comprising at least two physical antenna ports, causes the terminal device to:
obtain an indication of inferior physical radio propagation channel conditions;
based at least on obtaining the indication of inferior physical radio propagation channel conditions, create a virtual antenna port for, and applied over, at least two of the physical antenna ports; and
transmit, in the virtual antenna port, as many uplink reference signals as there are physical antenna ports.

* * * * *

UNITED STATES PATENT AND TRADEMARK OFFICE
CERTIFICATE OF CORRECTION

PATENT NO. : 11,139,864 B2  
APPLICATION NO. : 16/343175  
DATED : October 5, 2021  
INVENTOR(S) : Petersson et al.

Page 1 of 1

It is certified that error appears in the above-identified patent and that said Letters Patent is hereby corrected as shown below:

In the Specification

In Column 5, Line 52, delete "network no." and insert -- network 110. --, therefor.

In Column 5, Line 62, delete "network no" and insert -- network 110 --, therefor.

In Column 6, Line 64, delete "PAS 270" and insert -- PAs 270 --, therefor.

In Column 11, Line 55, delete "functional modules 10$a$-210$e$" and insert -- functional modules 210$a$-210$e$ --, therefor.

In Column 11, Line 60, delete "functional module 10$a$-210$e$" and insert -- functional module 210$a$-210$e$ --, therefor.

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*